(12) United States Patent
Nakamura (10) Patent No.: US 8,792,003 B2
(45) Date of Patent: Jul. 29, 2014

(54) CAMERA DEVICE

(75) Inventor: Akihiro Nakamura, Saitama (JP)

(73) Assignee: Sony Corporation (JP)

( * ) Notice: Subject to any disclaimer, the term of this patent is extended or adjusted under 35 U.S.C. 154(b) by 351 days.

(21) Appl. No.: 12/931,603

(22) Filed: Feb. 4, 2011

(65) Prior Publication Data

US 2011/0199485 A1 Aug. 18, 2011

(30) Foreign Application Priority Data

Feb. 12, 2010 (JP) ................ P2010-028885

(51) Int. Cl.
*H04N 7/18* (2006.01)
*G03B 17/08* (2006.01)

(52) U.S. Cl.
USPC ............................. 348/148; 396/29

(58) Field of Classification Search
USPC ............... 348/148; 359/533; 396/29
See application file for complete search history.

(56) References Cited

U.S. PATENT DOCUMENTS

| | | | |
|---|---|---|---|
| 4,277,804 A * | 7/1981 | Robison .................. | 348/148 |
| 5,066,965 A * | 11/1991 | Tanaka et al. ................ | 396/29 |
| 5,212,509 A * | 5/1993 | Kosako et al. ................ | 396/29 |
| 8,223,203 B2 * | 7/2012 | Ohsumi et al. ................ | 348/148 |
| 2004/0114039 A1 * | 6/2004 | Ishikura ................ | 348/148 |
| 2006/0110146 A1 * | 5/2006 | Ariga ................ | 396/27 |
| 2007/0020987 A1 * | 1/2007 | Shirako et al. ................ | 439/362 |
| 2007/0296853 A1 * | 12/2007 | Ho ................ | 348/373 |
| 2008/0075442 A1 * | 3/2008 | Yamashita ................ | 396/25 |
| 2009/0225455 A1 * | 9/2009 | Kawasaki et al. ................ | 359/830 |
| 2009/0244735 A1 * | 10/2009 | Sasaki ................ | 359/830 |

FOREIGN PATENT DOCUMENTS

JP  2009-265473 A  11/2009

* cited by examiner

*Primary Examiner* — Sath V Perungavoor
*Assistant Examiner* — Peter D Le
(74) *Attorney, Agent, or Firm* — Lerner, David, Littenberg, Krumholz & Mentlik, LLP

(57) ABSTRACT

Disclosed herein is a camera device including: a housing having an opening; a lens exposed from the opening of the housing; a lens barrel for holding the lens, the lens barrel being fitted in the housing to expose the lens from the opening of the housing; a packing provided between the lens barrel and the housing for preventing the entry of a water flow passed through the opening; an imaging mechanism having an imaging device for detecting incident light transmitted through the lens; and a buffer portion configured to reduce the pressure of the water flow in a water flow path between the opening and the packing.

10 Claims, 9 Drawing Sheets

CAMERA DEVICE

CROSS-REFERENCE TO RELATED APPLICATION

The present application claims priority from Japanese Patent Application No. JP 2010-028885 filed in the Japanese Patent Office on Feb. 12, 2010, the entire content of which is incorporated herein by reference.

BACKGROUND OF THE INVENTION

1. Field of the Invention

The present invention relates to a camera device, and more particularly to a camera device preferably used as an on-vehicle camera mounted on a vehicle such as an automobile to improve the convenience and safety of the vehicle.

2. Description of the Related Art

A camera device mounted on a vehicle body of an automobile to improve the convenience and safety of the automobile is known in the past. In such a camera device, an image detected by the camera device is visually recognized through a monitor device provided near a cockpit. This kind of camera device has a substantially rectangular housing containing an imaging lens and an imaging device. This housing is built in or mounted on a back door, outside rearview mirrors, front spoiler, etc. of the vehicle body so as to expose the imaging lens to the outside of the housing. According to such a camera device, an area around the vehicle that may become a blind spot to a driver can be imaged, thereby improving the safety and convenience of the vehicle.

Figure 10:
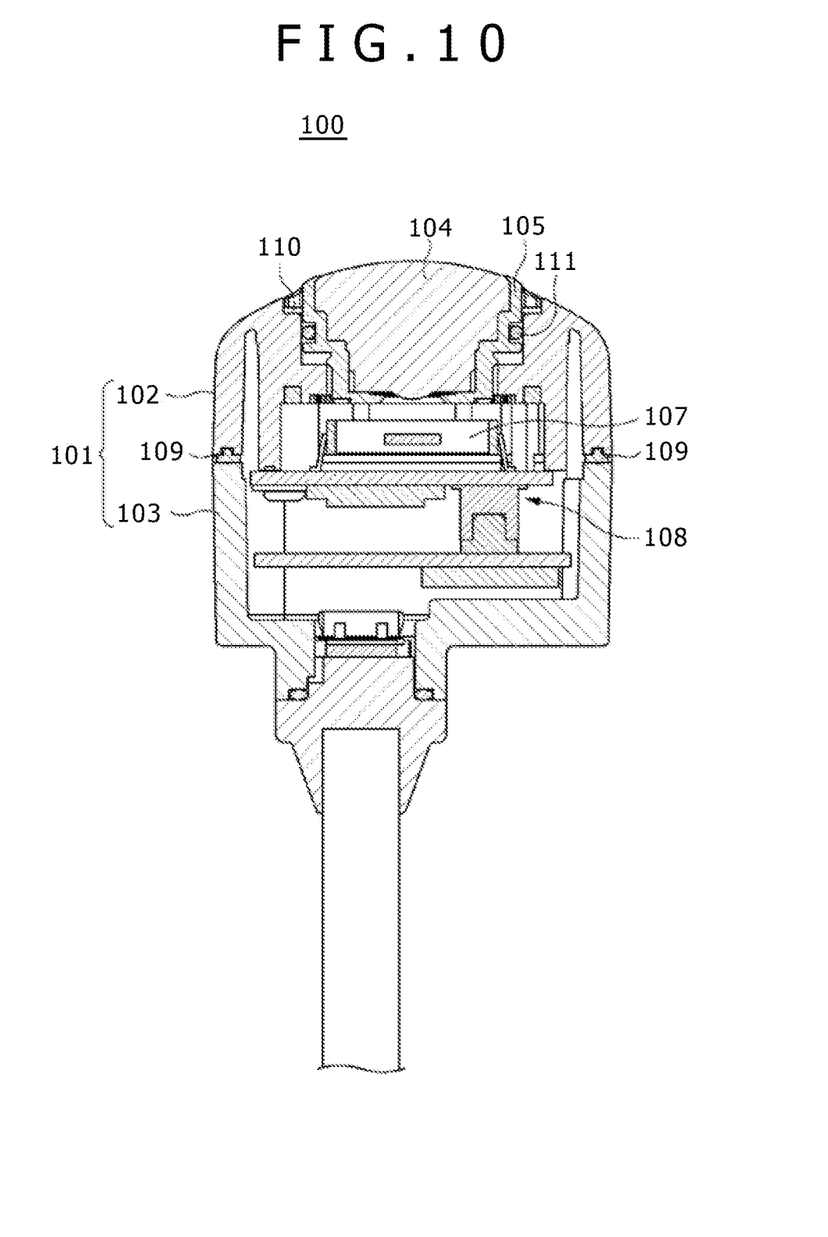
FIG. 10 is a sectional view of a camera device in the related art.

This kind of camera device includes a watertight structure provided between the housing and a lens barrel for holding the imaging lens. FIG. 10 shows an existing camera device 100 including a housing 101 composed of a front case 102 and a rear case 103 joined together, an imaging lens 104, a lens barrel 105 built in the front case 102 for holding the imaging lens 104, and an imaging mechanism 108 having an imaging device 107 for detecting incident light transmitted through the imaging lens 104.

The front case 102 and the rear case 103 of the housing 101 are joined together by means of screws with a packing 109 interposed therebetween. Accordingly, the entry of water from a joined portion between the front case 102 and the rear case 103 can be prevented by the packing 109.

The front case 102 of the housing 101 is formed with an opening 110, and the lens barrel 105 is fitted in the opening 110 of the front case 102. Further, a packing 111 is interposed between the front case 102 and the lens barrel 105. Accordingly, the entry of water from a clearance between the front case 102 and the lens barrel 105 can be prevented by the packing 111.

Some of the related art is discussed in Japanese Patent Laid-Open No. 2009-265473.

SUMMARY OF THE INVENTION

In general, the performance required by the watertight structure in an on-vehicle camera such as the camera device 100 is evaluated as a watertight performance in the case that the camera device is immersed in water. Accordingly, unless water enters the camera device immersed in water, the watertight performance satisfies a given standard. However, since the on-vehicle camera is exposed to the outside of the vehicle body, the watertight performance must be maintained also against high-pressure hot water sprayed by a high-pressure car wash, for example.

In an existing on-vehicle camera capable of supporting high-pressure water, a watertight performance is maintained by using dedicated watertight parts and an adhesive, causing an increase in parts count and cost.

It is accordingly desirable to provide a camera device which can maintain a watertight performance much higher in level than the existing watertight standard with a simple structure.

In accordance with the present invention, there is provided a camera device including a housing having an opening; a lens exposed from the opening of the housing; a lens barrel for holding the lens, the lens barrel being fitted in the housing to expose the lens from the opening of the housing; a packing provided between the lens barrel and the housing for preventing the entry of a water flow passed through the opening; an imaging mechanism having an imaging device for detecting incident light transmitted through the lens; and with a buffer portion configured to reduce the pressure of the water flow in a water flow path between the opening and the packing.

According to an embodiment of the present invention, the water flow that has entered the housing from the opening first strikes the buffer portion before reaching the packing. That is, the water flow does not directly strike the packing. Accordingly, the watertight effect of the packing can be reliably maintained.

Other features of the invention will be more fully understood from the following detailed description and appended claims when taken with the accompanying drawings.

DETAILED DESCRIPTION OF THE PREFERRED EMBODIMENTS

Preferred embodiments of the present invention will now be described in detail with reference to the drawings. The description will be made in the following order.

1. Housing
2. Lens barrel
3. Buffer portion

Figure 1:
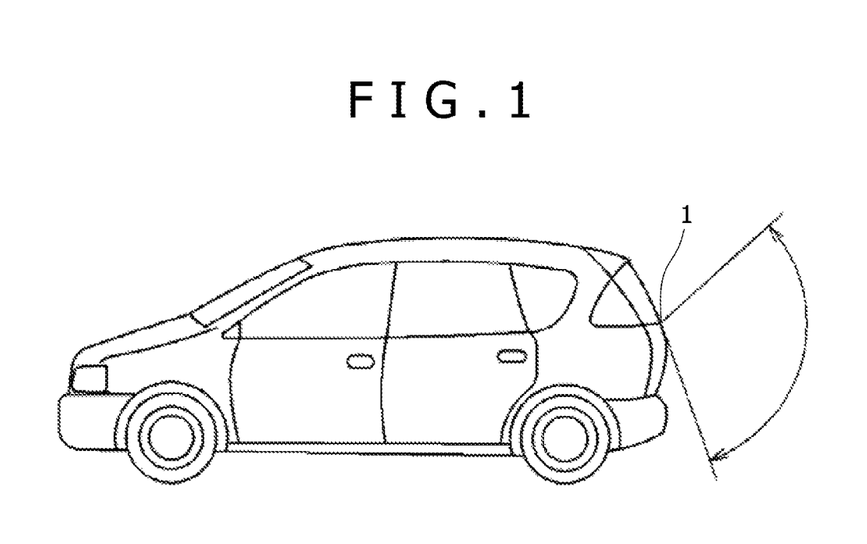
FIG. 1 is a side view of an automobile on which a camera device according to a preferred embodiment of the present invention is mounted.
Figure 2:
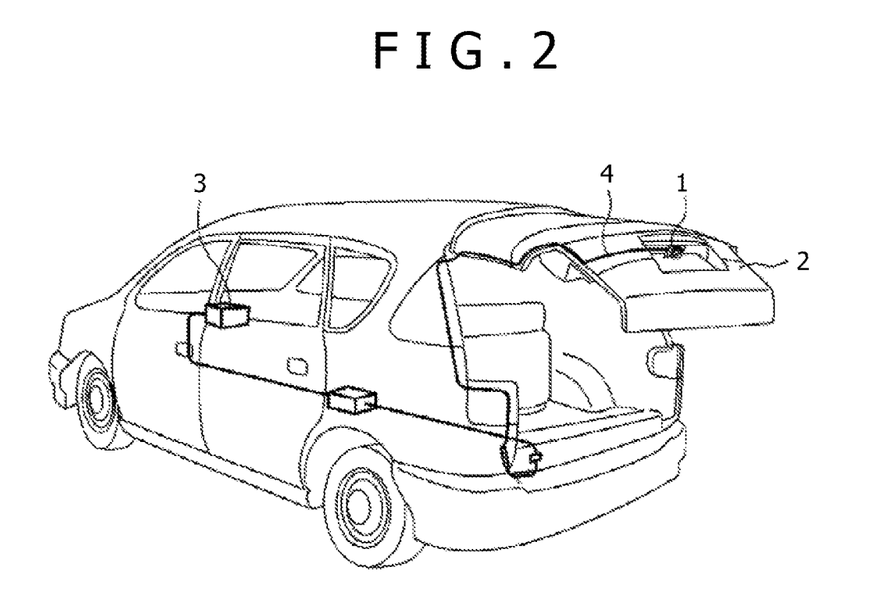
FIG. 2 is a perspective view of the automobile shown in FIG. 1.
Figure 3:
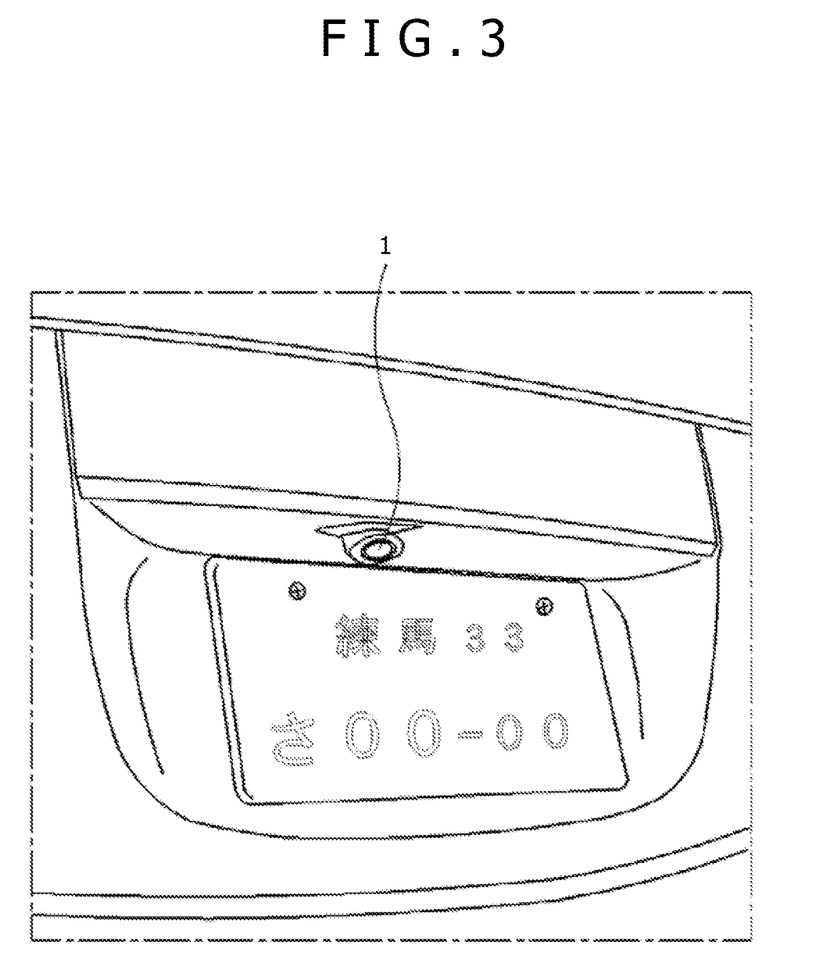
FIG. 3 is an enlarged perspective view of part of the automobile shown in FIG. 1, showing a mount position of the camera device.

As shown in FIG. 1, a camera device 1 according to an embodiment of the present invention is used as a rear monitor provided at the rear portion of the vehicle body of an automobile for monitoring the back side of the vehicle body. As shown in FIGS. 2 and 3, the camera device 1 is mounted on a back door 2 at a substantially central position thereof and connected to a navigation system 3 or the like, wherein a monitor is provided on a driver side dashboard or instrument panel and an image on the back side of the vehicle body can be displayed on this monitor. The camera device 1 may be mounted on the frontmost portion of the vehicle body, such as the lower portion of a front grille or a front license plate, thereby monitoring the right and left blind spots on the front side of the vehicle body. Further, the camera device 1 may be mounted on the lower portion of each outside rearview mirror, thereby monitoring the side blind spots on the right and left sides of the vehicle body.

Figure 4:
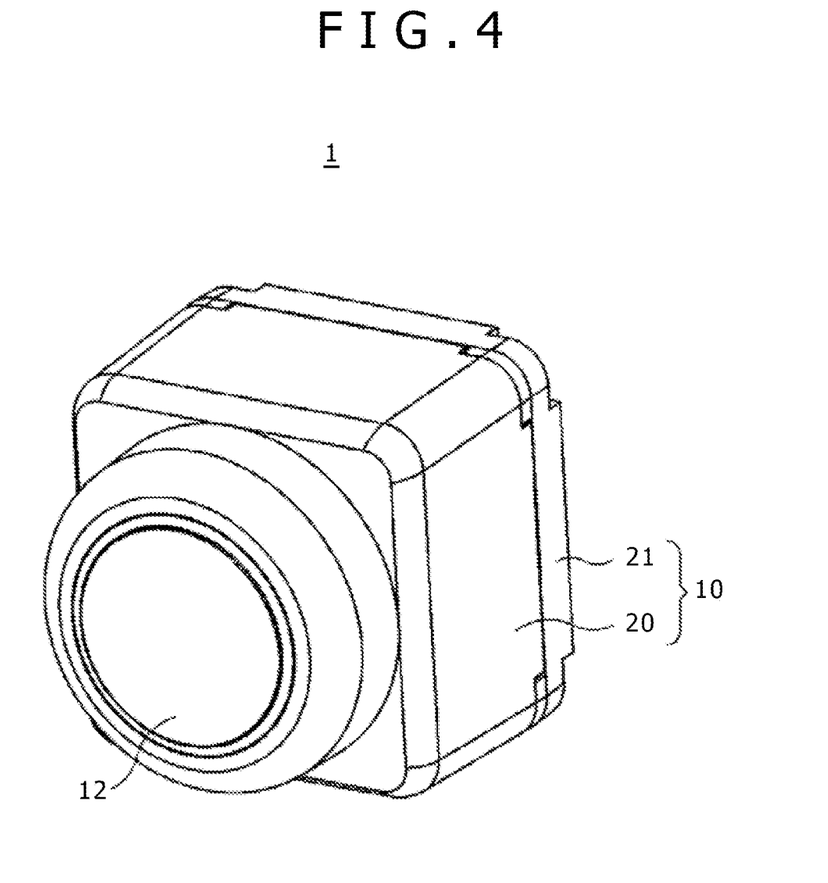
FIG. 4 is a perspective view of the camera device.
Figure 5:
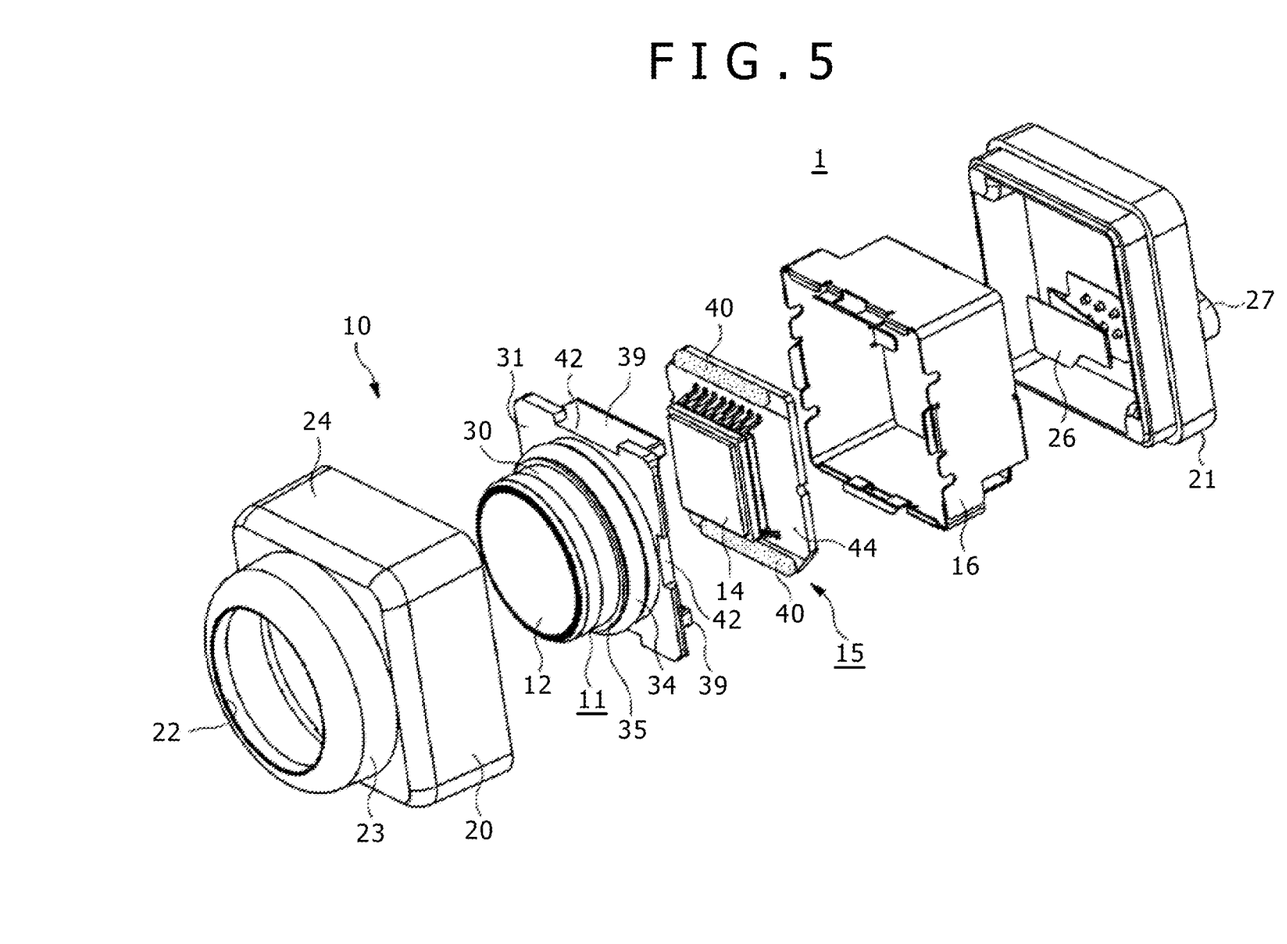
FIG. 5 is an exploded perspective view of the camera device.
Figure 6:
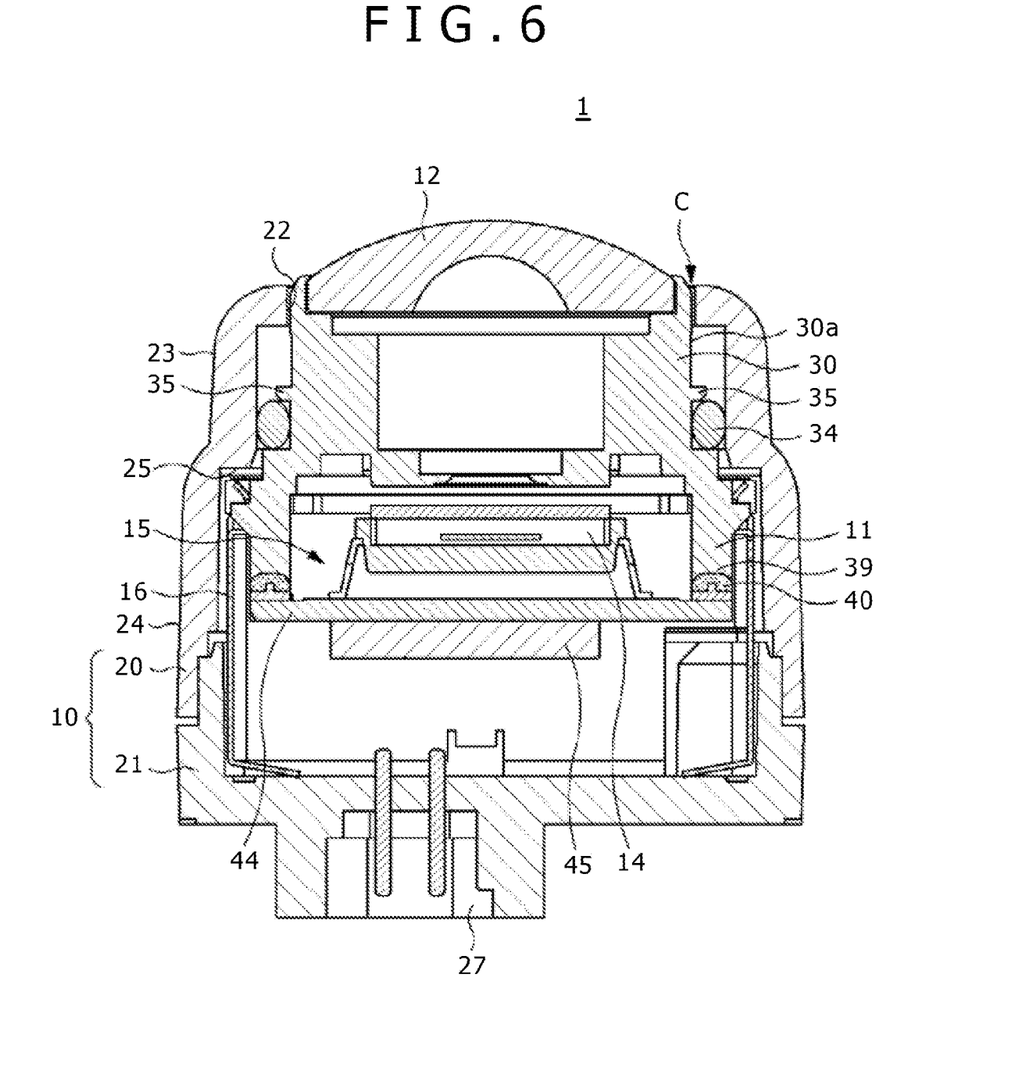
FIG. 6 is a sectional view of the camera device.

As shown in FIGS. 4 to 6, the camera device 1 includes a substantially rectangular housing 10, a lens barrel 11 fitted in the housing 10, an imaging mechanism 15 having an imaging device 14 such as a CCD (charge coupled device) and a CMOS (complementary metal oxide semiconductor) for detecting an image through an imaging lens 12 held by the lens barrel 11, and a shield case 16 for supporting the imaging mechanism 15 in the housing 10 and functioning as a ground to shield any internal and external electromagnetic waves.

<1. Housing>

The housing 10 is composed of a front case 20 and a rear case 21 joined together. The front case 20 and the rear case 21 are substantially rectangular members formed by molding of engineering plastic. The front case 20 and the rear case 21 are joined together by engaging the mating end portions of the front and rear cases 20 and 21 and then bonding them by ultrasonic welding.

The front case 20 is composed of a cylindrical portion 23 having a circular opening 22 at a substantially central position and a rectangular portion 24 having an internal structure for engaging the lens barrel 11 and an external structure for engaging the rear case 21. The circular opening 22 has a diameter slightly larger than the outer diameter of the lens barrel 11. An engaging shoulder portion 25 for engaging the lens barrel 11 through the shield case 16 is formed at the boundary between the cylindrical portion 23 and the rectangular portion 24. The lens barrel 11 is inserted into the front case 20 from its rear end until coming into engagement with the engaging shoulder portion 25. In this condition, the outer circumferential surface of the lens barrel 11 is fitted in the circular opening 22 of the front case 20.

The rear case 21 has a substantially rectangular shape adapted to be joined to the rectangular portion 24 of the front case 20. The rear closed end of the rear case 21 is provided with a connection terminal 26 adapted to be connected to the imaging mechanism 15 and a jack portion 27 for engaging a connector cable 4 (see FIG. 2).

<2. Lens Barrel>

The lens barrel 11 has a cylindrical barrel portion in which the imaging lens 12 is built and a platelike portion 31 adapted to be joined to a substrate 44 of the imaging mechanism 15. The imaging lens 12 is held by the barrel portion 30 at its front end. The barrel portion 30 has an outer circumferential surface 30a, and an O ring 34 for preventing the water passed through the circular opening 22 of the front case 20 from further flowing into the housing 10. More specifically, when the lens barrel 11 is fitted in the front case 20, the O ring 34 is held between the inner circumferential surface of the cylindrical portion 23 of the front case 20 and the outer circumferential surface 30a of the barrel portion 30 of the lens barrel 11, thereby sealing the annular space between the lens barrel 11 and the front case 20 to prevent the water from flowing toward the rear case 21. In the camera device 1, the O ring 34 may be replaced by various kinds of packing having a watertight performance.

<3. Buffer Portion>

The outer circumferential surface 30a of the barrel portion 30 is formed with a buffer wall 35 at a position on the front side of the O ring 34. The buffer wall 35 functions to reduce the pressure of a water flow entering the housing 10 through a minute clearance C defined between the inner wall of the circular opening 22 and the outer circumferential surface 30a of the barrel portion 30. As shown in FIG. 6, the buffer wall 35 projects from the outer circumferential surface 30a of the barrel portion 30 into a water flow path between the inner circumferential surface of the cylindrical portion 23 of the front case 20 and the outer circumferential surface 30a of the barrel portion 30.

Accordingly, the water flow that has entered the housing 10 through the clearance C first strikes the buffer wall 35 before reaching the O ring 34. That is, the water flow does not directly strike the O ring 34. In a high-pressure car wash or the like, hot water is sometimes used to improve a washing effect. However, if such a high-pressure hot water flow directly strikes the O ring 34, the modulus of elasticity of the O ring 34 may be lowered to cause a problem that the watertight effect of the O ring 34 cannot be maintained. Further, even when an adhesive or the like is used to improve the watertight performance, the direct strike of the high-pressure hot water flow on the adhesive similarly causes a problem that the watertight effect of the adhesive cannot be maintained.

In contrast, according to this preferred embodiment, the buffer wall 35 is provided in the path of a high-pressure hot water flow, thereby preventing the direct strike of the water flow on the O ring 34. As a result, the watertight effect of the O ring 34 can be reliably maintained.

In the camera device 1, a plurality of buffer walls similar to the buffer wall 35 may be provided to further reduce the pressure of the water flow. Further, in the case that the buffer wall 35 is formed at a position directly above the O ring 34 as viewed in FIG. 6, the buffer wall 35 functions also as means for positioning the O ring 34.

[Other Preferred Embodiments]

Figure 7:
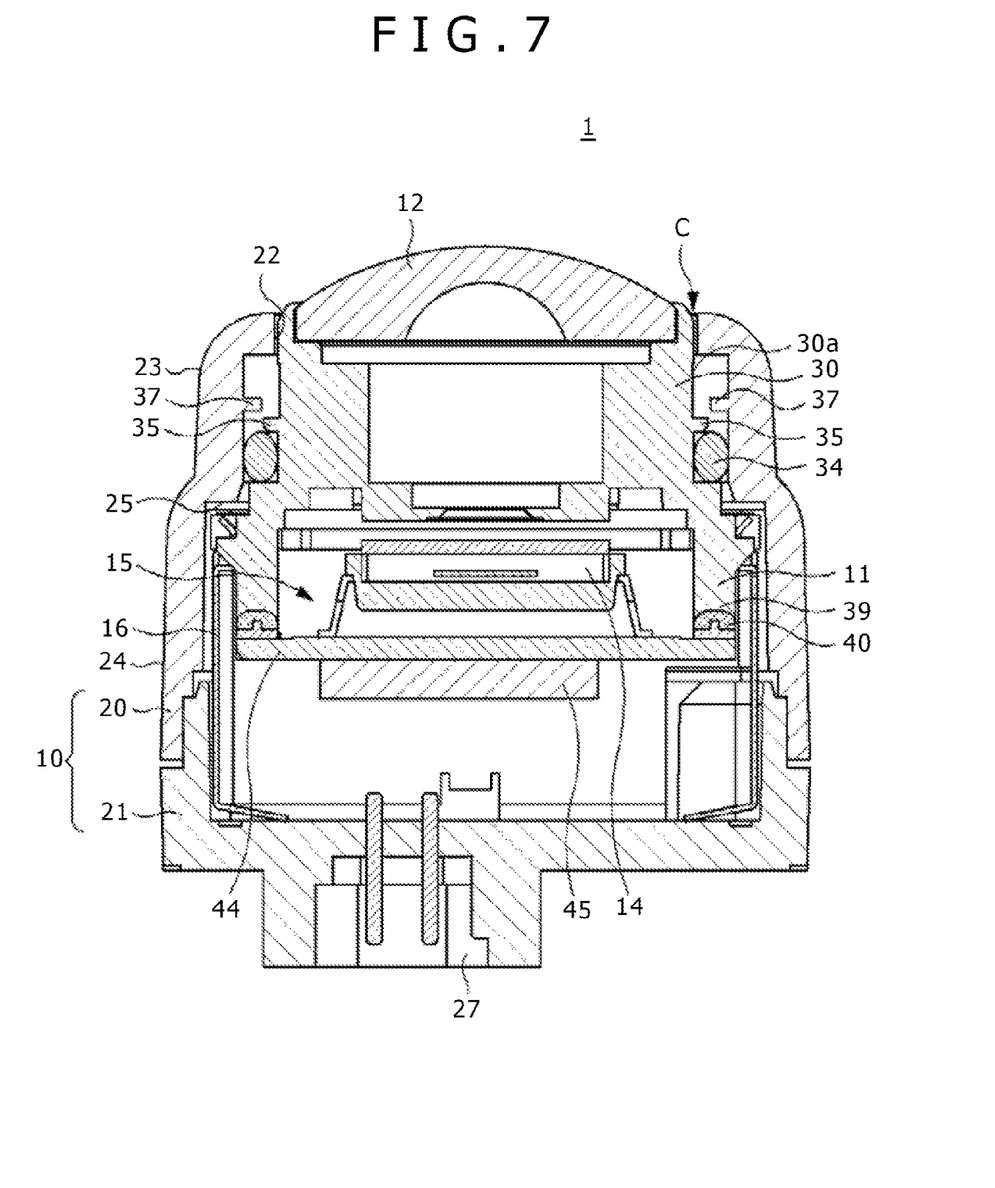
FIG. 7 is a sectional view of a camera device according to another preferred embodiment of the present invention.

FIG. 7 shows another preferred embodiment of the present invention, wherein a buffer wall 35 is formed on the outer circumferential surface 30a of the barrel portion 30 of the lens barrel 11 and a buffer projection 37 is additionally formed on the inner wall of the cylindrical portion 23 of the front case 20. Accordingly, the buffer projection 37 and the buffer wall 35 respectively project from the inner wall of the cylindrical portion 23 and the outer circumferential surface 30a of the barrel portion 30 into the path of a high-pressure hot water flow, so that the water flow first directly strikes the buffer projection 37 and next strikes the buffer wall 35. Accordingly, the pressure of the water flow can be reduced more reliably.

Figure 8:
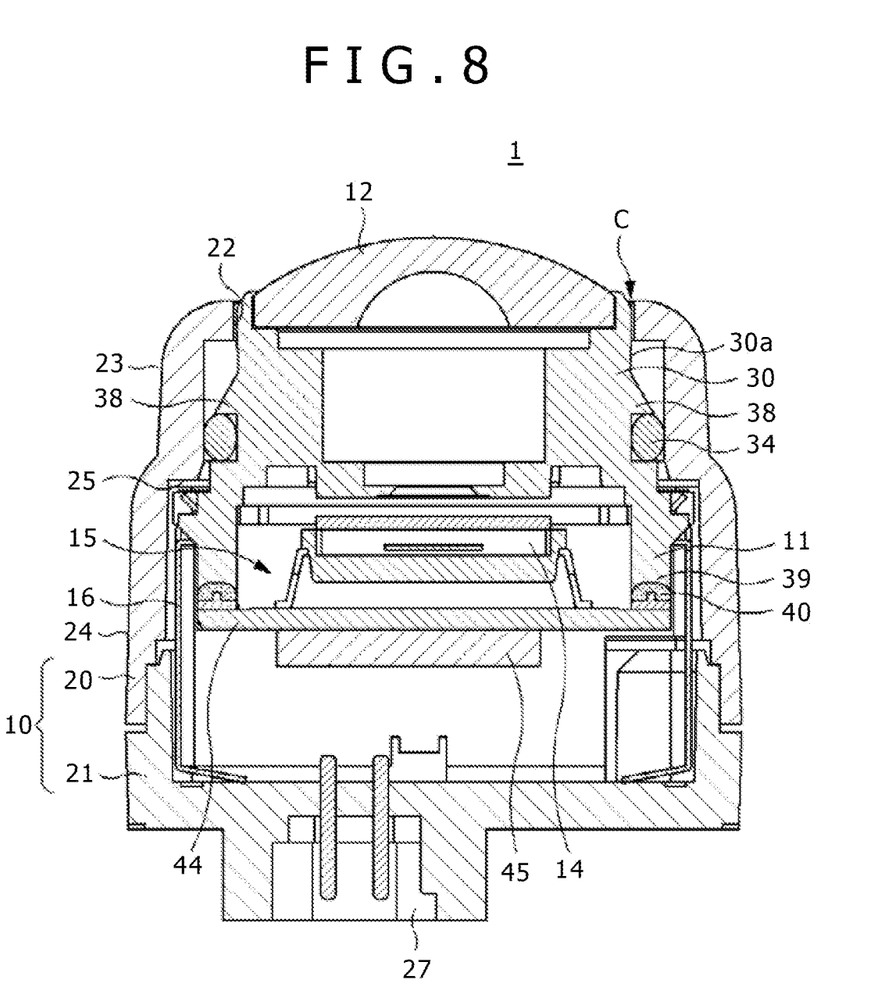
FIG. 8 is a sectional view of a camera device according to still another preferred embodiment of the present invention.

FIG. 8 shows still another preferred embodiment of the present invention, wherein a conical surface 38 is formed on the outer circumferential surface 30a of the barrel portion 30 so as to gradually increase in diameter toward the rear end of the lens barrel 11 as approaching the inner wall of the cylindrical portion 23 of the front case 20. By forming the conical surface 38, the pressure of the water flow can be reduced and the direct strike of the water flow on the O ring 34 can be reliably prevented.

As shown in FIG. 5, the platelike portion 31 has a rectangular shape, and the barrel portion 30 is formed at the center on one surface of the platelike portion 31 on the front side of the camera device 1. On the other hand, a pair of connection blocks 39 project from the other surface of the platelike portion 31 on the rear side of the camera device 1. The connection blocks 39 are connected to the substrate 44 of the imaging mechanism 15. The rear end surface (lower end surface as viewed in FIG. 6) of each connection block 39 opposed to the substrate 44 is formed with a groove to be filled with an adhesive 40, so that the substrate 44 and the platelike portion 31 are bonded together by the adhesive 40. As shown in FIG. 5, each side edge of the platelike portion 31 is formed with an engagement recess 42 to be engaged with the shield case 16.

[Imaging Mechanism 15]

The imaging mechanism 15 connected to the connection blocks 39 will now be described. As shown in FIGS. 5 and 6, the imaging mechanism 15 has the imaging device 14 for detecting incident light transmitted through the imaging lens 12, the substrate 44 for mounting the imaging device 14 and forming various circuits, and a circuit chip 45 for processing an image detected by the imaging device 14. The imaging device 14 may be provided by a CCD or a CMOS, for example. The substrate 44 is a rigid substrate having a substantially rectangular shape. The imaging device 14 is mounted on the front surface of the substrate 44, and the circuit chip 45 is formed on the back surface of the substrate 44. Further, a terminal portion (not shown) to be connected to a connector connected to a harness having signal and power cables is also formed on the back surface of the substrate 44. The substrate is bonded to the connection blocks 39 by the adhesive 40 applied to the front surface of the substrate 44 along its opposite side edges in the condition where the imaging device 14 is opposed to the imaging lens 12 provided at the front end of the lens barrel 11 and focusing of the imaging lens 12 is carried out.

More specifically, a pair of adhesive applying areas for the adhesive 40 are provided on the front surface of the substrate 44 along its opposite side edges so as to correspond to the pair of connection blocks 39 projecting from the back surface of the platelike portion 31 of the lens barrel 11. These adhesive applying areas are provided along the opposite side edges of the substrate 44 where parts cannot be mounted. Accordingly, the adhesive applying areas can be provided by effectively utilizing a limited space as ensuring a mounting area for the imaging device 14 and other electronic parts and a forming area for circuit patterns. Thus, a size enlargement of the substrate 44 can be suppressed.

The adhesive 40 applied to the adhesive applying areas is provided by an ultraviolet curing adhesive or a thermosetting adhesive, for example. After applying the adhesive 40 to the adhesive applying areas of the substrate 44, the substrate 44 is mounted on the rear surface (lower surface as viewed in FIG. 6) of each connection block 39 having a groove to be filled with the adhesive 40. After performing the alignment of the imaging lens 12 mounted on the lens barrel 11 and the imaging device 14 mounted on the substrate 44 and also performing the focusing of the imaging lens 12, the adhesive 40 is cured by applying ultraviolet radiation, for example, to thereby fix the substrate 44 to the connection blocks 39.

Thereafter, the unit of the substrate 44 and the lens barrel 11 is connected to the shield case 16, and the shield case 16 is fitted into the rear case 21. Thereafter, the lens barrel 11 is fitted into the front case 20 from its rear end. Finally, the front case 20 and the rear case 21 are joined together by ultrasonic welding to thereby manufacture the camera device 1. In this camera device 1, the front case and the rear case 21 are joined together by ultrasonic welding. Accordingly, a watertight effect can be obtained at such a joined portion between the front case 20 and the rear case 21 without the need for any special configuration. As a modification, the front case 20 and the rear case 21 may be bonded together by an adhesive.

In this manner, the lens barrel 11 and the imaging mechanism 15 are preliminarily assembled as a unit, and this unit is built into the housing 10 in manufacturing the camera device 1. Accordingly, the unit of the lens barrel 11 and the imaging mechanism 15 may be applied also to another housing different in outer diameter from the housing 10. For example, the unit of the lens barrel 11 and the imaging mechanism 15 is commonly applicable to various housings fit for various vehicles having different external designs.

As described above, the lens barrel 11 and the imaging mechanism 15 are preliminarily assembled as a unit. Accordingly, although a space is formed between the opening 22 and the O ring 34 and high-pressure hot water may enter this space through the opening 22, the flow of this hot water does not directly strike the O ring 34 because a buffer portion such as the buffer wall 35, the buffer projection 37, and the conical surface 38 is formed in the path of the water flow as shown in FIGS. 6 to 8. As a result, the watertight performance of the O ring 34 can be maintained.

In manufacturing the camera device 1, the front case and the rear case 21 are joined together by ultrasonic welding. Accordingly, in joining the front case 20 and the rear case 21, vibration is transmitted to the unit of the lens barrel 11 and the imaging mechanism 15. To prevent the misalignment between the imaging lens 12 and the imaging device 14 due to vibration or the damage due to friction, the minute clearance C is intentionally defined between the inner wall of the opening 22 of the front case 20 and the outer circumferential surface 30a of the barrel portion 30 of the lens barrel 11 (see FIG. 6). Accordingly, there is a possibility that the high-pressure hot water from a high-pressure car wash may enter the camera device 1 from this minute clearance C. However, the camera device 1 includes the O ring 34 provided between the lens barrel 11 and the front case 20 and the buffer portion such as the buffer wall 35, the buffer projection 37, and the conical surface 38 provided in the path of the high-pressure hot water flow. With this arrangement, the high-pressure hot water flow does not directly strike the O ring 34 owing to the formation of the buffer portion, so that the watertight performance of the O ring 34 can be maintained.

Further, according to the camera device 1, the pressure of the high-pressure hot water flow can be reduced by simply forming the buffer portion such as the buffer wall 35, the buffer projection 37, and the conical surface 38 on the lens barrel 11 or the front case 20. Accordingly, the watertight performance can be improved by a simple configuration without increasing the number of parts and the number of manufacturing steps.

Figure 9:
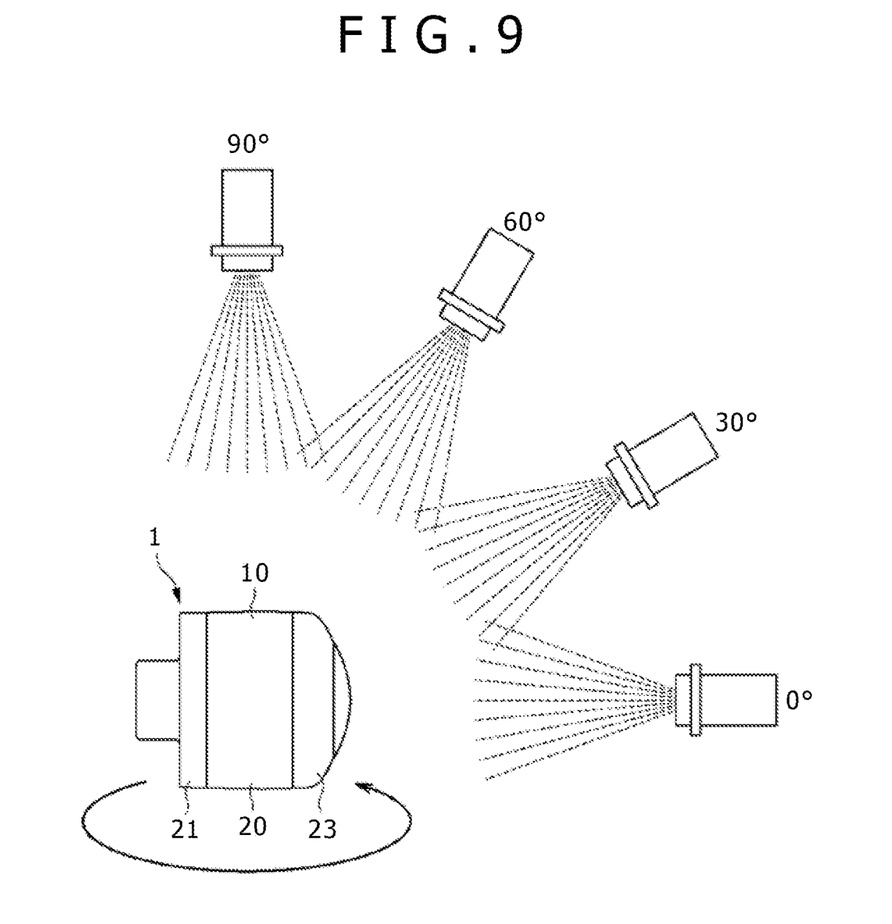
FIG. 9 is a schematic side view for illustrating a watertight standard.

Further, the camera device 1 can maintain the watertight performance even when it is subjected to the spray of a high-pressure hot water flow as defined by IP69K standard, for example. The IP69K standard is a protective regulation against high-pressure hot water as defined by German Standard DIN40050PART9. More specifically, as shown in FIG. 9, hot water having a temperature of 80° C. is sprayed from a nozzle having a specified shape toward a sample under a pressure of 80 to 100 BAR at a rate of 14 to 16 liters/min. The distance between the sample and the nozzle is set to 10 to 15 cm, and the spray angle is set to 0, 30, 60, and 90 degrees with respect to a horizontal direction. At each spray angle, the sample is rotated for 30 seconds in a horizontal plane. The camera device 1 having the above-mentioned configuration can satisfy this IP69K standard.

While the camera device 1 is used as a on-vehicle camera in the above preferred embodiments, the camera device of the present invention is applicable also to a security camera and an intercom camera, for example. Also in this case, the camera device can be widely used in various installation conditions owing to the configuration that the buffer portion such as the buffer wall 35, the buffer projection 37, and the conical surface 38 is formed in the water flow path present in the space between the opening 22 of the front case 20 and the lens barrel 11, thereby preventing the direct strike of the water flow on the O ring 34.

It should be understood by those skilled in the art that various modifications, combinations, sub-combinations and alterations may occur depending on design requirements and other factor in so far as they are within the scope of the appended claims or the equivalents thereof.

What is claimed is:

1. A camera device comprising:
   a housing having an opening;
   a lens exposed from said opening of said housing;
   a lens barrel for holding said lens, said lens barrel being fitted in said housing to expose said lens from said opening of said housing;
   a packing provided between said lens barrel and said housing for preventing the entry of a water flow passed through said opening;
   an imaging mechanism having an imaging device for detecting incident light transmitted through said lens; and
   a buffer portion configured to reduce the pressure of said water flow in a water flow path between said opening and said packing;
   wherein the buffer portion comprises at least first and second buffer walls projecting from opposite walls of the water flow path.

2. The camera device according to claim 1, wherein said buffer portion comprises a buffer wall projecting from an outer circumferential surface of said lens barrel.

3. The camera device according to claim 1, wherein said buffer portion comprises a buffer projection formed on an inner wall of said housing.

4. The camera device according to claim 1, wherein said buffer portion comprises a conical surface formed on an outer circumferential surface of said lens barrel so as to gradually increase in diameter toward the rear end of said lens barrel.

5. The camera device according to claim 1, wherein said housing is composed of a front case having said opening and a rear case containing said imaging mechanism; and
   said front case and said rear case are joined together by ultrasonic welding or adhesive.

6. The camera device according to claim 5, wherein said imaging mechanism includes a substrate for mounting said imaging device, said substrate being contained in said housing.

7. The camera device according to claim 6, wherein said imaging mechanism and said lens barrel are preliminarily assembled as a unit;
   said unit is supported in said rear case; and
   said lens barrel is fitted in said opening of said front case.

8. The camera device according to claim 7, wherein said camera device is used as an on-vehicle camera.

9. The camera device according to claim 1, wherein the water flow is a high pressure water jet flow.

10. The camera device according to claim 2, wherein the buffer wall is at a position other than on an axis extending through the opening.

* * * * *